(12) United States Patent
Hokansson et al.

(10) Patent No.: US 7,406,238 B2
(45) Date of Patent: Jul. 29, 2008

(54) OPTICAL FIBER WITH EXTENDED BANDWIDTH FOR CRIMP AND CLEAVE CONNECTORS

(75) Inventors: Adam S. Hokansson, Granby, CT (US); Jie Li, Unionville, CT (US); Xiaoguang Sun, West Hartford, CT (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/489,860

(22) Filed: Jul. 20, 2006

(65) Prior Publication Data

US 2008/0019650 A1    Jan. 24, 2008

(51) Int. Cl.
*G02B 6/02*    (2006.01)
(52) U.S. Cl. ...................... 385/128; 385/123
(58) Field of Classification Search .................. 385/128
See application file for complete search history.

(56) References Cited

U.S. PATENT DOCUMENTS

| | | | | |
|---|---|---|---|---|
| 4,270,840 A | * | 6/1981 | Uchida et al. | 385/141 |
| 4,511,209 A | | 4/1985 | Skutnik | |
| 4,682,580 A | * | 7/1987 | Fukumoto | 126/299 D |
| 4,690,503 A | * | 9/1987 | Janssen et al. | 385/128 |
| 4,707,076 A | | 11/1987 | Skutnik et al. | |
| 4,875,758 A | * | 10/1989 | Masuda et al. | 385/100 |
| 5,123,076 A | | 6/1992 | Nishimoto et al. | |
| 5,644,670 A | * | 7/1997 | Fukuda et al. | 385/124 |
| 5,748,826 A | * | 5/1998 | Nagano et al. | 385/128 |
| 5,887,104 A | * | 3/1999 | Sugizaki et al. | 385/123 |
| 6,222,972 B1 | * | 4/2001 | Yamamoto et al. | 385/127 |
| 6,775,451 B1 | * | 8/2004 | Botelho et al. | 385/128 |
| 6,895,156 B2 | | 5/2005 | Walker, Jr. et al. | |
| 7,272,289 B2 | * | 9/2007 | Bickham et al. | 385/128 |
| 2003/0123839 A1 | * | 7/2003 | Chou et al. | 385/145 |
| 2003/0142940 A1 | * | 7/2003 | Qi et al. | 385/127 |
| 2007/0078247 A1 | * | 4/2007 | Winningham | 526/286 |

FOREIGN PATENT DOCUMENTS

| | | |
|---|---|---|
| EP | 1 022 592 A1 * | 7/2000 |
| WO | WO 1998/23982 * | 4/1998 |

* cited by examiner

*Primary Examiner*—Hemang Saghavi
*Assistant Examiner*—Kajli Prince

(57) ABSTRACT

An optical fiber includes a large graded index core of Ge doped silica for an increased bandwidth-length-product of over 100 MHz-km. A cladding layer of non-doped silica is formed on the core during the preform process and subsequently during drawing the preform an ultraviolet light curable polymer first coating is overlaid on the cladding layer. The first coating is sufficiently hardened to match the fracture characteristics of the silica core and cladding layer to facilitate crimp and cleave termination. The first coating is additionally provided with an index of refraction greater than the cladding layer to enable mode or energy stripping from the cladding layer. A second polymer layer may optionally be applied during draw for protection and to provide a tough outer layer of the optical fiber for the deformable features of a connector to hold onto after crimping.

17 Claims, 2 Drawing Sheets

| FIBER CHARACTERISTICS | EXAMPLE 1 | EXAMPLE 2 | EXAMPLE 3 | Si POLYMER CLAD Si CORE |
|---|---|---|---|---|
| NUMERICAL APERTURE | .275 | .275 | .275 | .37 |
| B-L-P @ 850 nm (MHzkm) | >100 | >100 | >100 | 10 |
| CORE DIAMETER (μm) | 62.5 | 100 | 62.5 | 200 |
| CLADDING DIAMETER (μm) | 200 | 200 | 125 | 225 |
| FIRST COATING DIAMETER (μm) | 225 | 225 | 140 | — |
| ATTENUATION @ 850 nm (dB/km) | 3.9 | 3.5 | 5.4 | 6 |
| ATTENUATION @ 1310 nm (dB/km) | 1.2 | 1.2 | 3.2 | — |
| CRIMP & CLEAVE CONNECTION | YES | YES | YES | YES |

OPERATING & PHYSICAL CHARACTERISTICS OF EXEMPLARY OPTICAL FIBER (TABLE A)

FIG 3

| | |
|---|---|
| REFRACTIVE INDEX | ≈ 1.46 |
| ELONGATION @ FRACTURE (%) | ≈ 9 |
| VISCOSITY (cp) @ 50° C | ≈ 23.48 |
| YOUNG'S MODULUS (Mpa) | ≈ 68 |

PROPERTIES FIRST COATING LAYER (TABLE B)

FIG 4

OPTICAL FIBER WITH EXTENDED BANDWIDTH FOR CRIMP AND CLEAVE CONNECTORS

BACKGROUND OF THE INVENTION

1. Field of the Invention

The invention pertains generally to optical fibers with high bandwidth and low attenuation and is more particularly directed to such optical fibers which can be easily terminated with a simple crimp and cleave connector process.

2. Description of Related Art

Optical fiber has revolutionized the communications industry in providing a low cost high bandwidth transmission medium for all types and forms of information. An area in optical fiber communications systems where improvements are continuing to be made is in the connectorization of such fibers. Because the optical fibers of these systems are essentially made of a silica glass and the diameters of the fiber are small, it is essential to put a connector on the ends of the fiber for the purpose of joining two pieces of fiber together or plugging the fiber into optical transmitter and receiver. Connectors can be put on the fiber by fusion splicing the fiber to a fiber pigtail (a short piece of fiber with connector pre-assembled in a factory) or by epoxying the fiber to the connector, then scribing and polishing the end. Such methods have been successful in the past, but are relatively complex, time consuming and expensive. For future planned optical distribution systems, such as fiber to the home systems, there are increasing requirements for the number of field terminations. Fast and easy connectorization becomes more important.

Low cost connectors for polymer clad, multi-mode optical fibers have been developed that rely on a simple crimp and cleave process. The optical fiber is cleaved by scoring the glass fiber with a fracture line and then breaking it so that an even plane orthogonal to the longitudinal axis of the fiber is formed across its end. The ends of two such cloven multi-mode fibers can then be joined by abutment, with or without an adhesive or index matching composition. The mechanical portion of the connector that supports the splice and holds the optical fiber ends together is then crimped to the outer surface of the optical fiber by deforming specially adapted (typically metal) spacing rings or features which then grip that outer surface.

One multi-mode fiber which is particularly adapted to the crimp and cleave connectorization process is a step index (SI) optical fiber having a non-doped silica core and an optical polymer coating of a lower refractive index forming a cladding layer. This optical fiber then may be coated with another buffer layer of a tough polymer such as ETFE without optical qualities for protection and to receive the deformation of the crimping mechanisms of the connectors. The first polymer coating is made in accordance with the teachings of U.S. Pat. Nos. 4,707,076 or 4,511,209 issued to Skutnik, et al. and comprises at least one ethylenically unsaturated monene, a polyene and a curing initiator. The disclosures of Skutnik, et al. are hereby incorporated by reference. Further additions are made to the polymer coating to make it hard so that during the cleaving process it will fracture cleanly with the glass core but still withstand the crimping process without breaking. This optical fiber exhibits many of the desirable optical qualities that are needed in the distribution type communications systems including its large core (typically about 200 µm), high numerical aperture (typically about 0.37) and the ability to be connectorized by the crimp and cleave process. However, because of its low bandwidth-length-product (BLP), approximately 10 MHz-km., it is difficult to use such optical fiber in newer applications which may require higher speeds or longer fiber link lengths.

Increased bandwidth can be realized in a multi-mode optical fiber by changing the index profile of the core from a constant (SI) to a graded index (GI), usually by creating a profile that follows the power function $R^\alpha$, where $\alpha$ is generally between 1.5 and 3. This is generally accomplished with an optical fiber having a silica core by doping the core material with a refractive index changing material as is conventional in the art. Increasing the refractive index of silica is accomplished by the addition of Germanium (Ge) or other known refractive increasing elements to the silica but is expensive in such large core fibers. However, with the large silica cores of the prior optical fibers used in crimp and cleave connectors, the addition of Ge to the entire core is prohibitive because of its cost and will not yield a sufficient increase in BLP for the fiber.

Therefore, there is a need for a large core optical fiber have a large numerical aperture and increased bandwidth-length product which is also inexpensive to manufacture and can be joined by a crimp and cleave connectorization process.

SUMMARY OF THE INVENTION

In one embodiment a high bandwidth easily connectorized optical fiber comprises a core and a cladding layer surrounding the core. Preferably, the core has a refractive index of between 1.460 and 1.484, which is greater than the cladding layer. For high bandwidth applications, the core utilizes a graded refractive index profile which has been increased by doping silica with a refractive index increasing dopant, such as Germanium. The cladding layer then can be of a lower refractive material, such as non-doped silica. The optical fiber further has a first coating layer surrounding the cladding layer which has a refractive index greater than the cladding layer, greater than 1.453 if the cladding layer is silica, preferably about 1.46. This allows the first coating layer to mode strip the light from the cladding layer and in combination with the graded index profile of the core increase the bandwidth-length-product of the optical fiber.

The first coating layer is preferably a UV curable polymer with similar fracture characteristics to the silica glass of the core and the cladding and having a good adhesion to the silica glass. Preferably the first coating layer has an elongation at fracture of less than 20%, preferably less than 10%, closely resembling that of silica. However, the first coating layer being a polymer is relatively tough and durable. The Young's modulus of the first coating when cured should exceed 50, and more preferably would be approximately 68. This produces the advantage of when the fiber is cleaved for connectorization that the first coating layer will fracture cleanly with the core and cladding but will remain durable enough for a connector to be crimped to it without fracturing above the cut.

These and other objects, aspects and features of the invention will be more clearly understood and better described when the following detailed description is read in conjunction with the attached drawings, wherein similar elements throughout the views have the same reference numerals, and wherein:

BRIEF DESCRIPTION OF THE DRAWINGS

FIG. 3 is a tabular representation of the operational and physical characteristics of several examples of the optical fiber illustrated in FIG. 1; and FIG. 4 is a tabular representation of the operational and physical characteristics oft the polymer coating layer illustrated in FIG. 1.

DETAILED DESCRIPTION OF THE EXEMPLARY EMBODIMENTS

Figure 1:
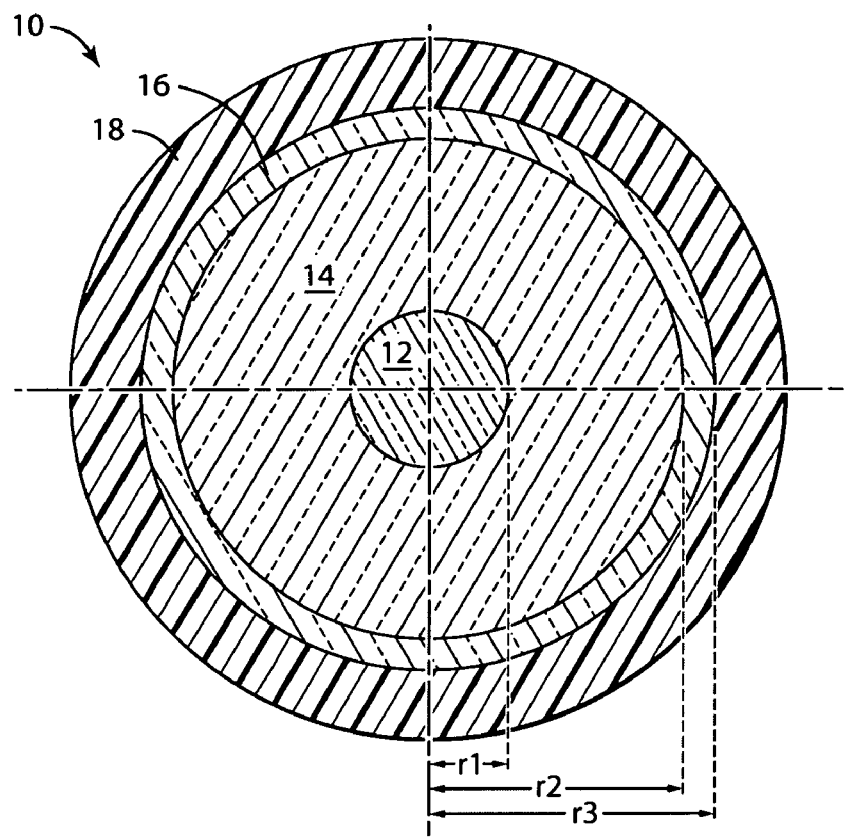
FIG. 1 is a cross-sectional end view of one example of an optical fiber constructed in accordance with the invention.

Referring to FIG. 1, there is shown an optical fiber 10 having a generally cylindrical core 12. Surrounding the core is a cladding layer 14, which in accordance with conventional wave guiding principles, has a generally lower index of refraction than the core. Surrounding the cladding layer 14 is a first coating layer 16 having a generally higher index of refraction than the cladding layer. Optionally, surrounding the first coating layer is a second coating layer 18.

The core 12 and the cladding layer 14 can be produced by the many methods of making an optical fiber preform. For example, inside methods such as Chemical Vapor Deposition (CVD), modified chemical vapor deposition (MCVD) or plasma chemical Vapor deposition (PCVD) or outside methods such as outside vapor deposition (OVD) or plasma outside vapor deposition (POVD) can be used. As an example, a glass core tube of substantially pure silica can be mounted on a MCVD lathe and glass component constituents in vapor form fed into the tube. The glass component constituents are then heated by a moving torch to react with each other and deposit thin layers of glass on the sides of the tube. Preferably, at least one of the gaseous constituents forming the core 12 may be a dopant which increases the refractive index of the core with respect to the cladding layer. Alternatively, the cladding layer may be subjected to processing with a dopant which decreases the refactive index of the cladding layer 14.

When the appropriate refractive index profile for an optical fiber preform is obtained, the tube and inner layers are collapsed and taken to a draw tower for processing as a preform or subsequently for drawing after being overclad with one or more overclad tubes.

The preform forming the core 12 and cladding layer 14 is then mounted on a draw tower and heated at one end in a furnace. The molten end of the preform is the placed under tension and drawn into long slender strand of optical fiber. While still semi-molten, the glass fiber is pulled and coated with a uniform thin liquid of the first coating layer 16 and optionally the second or more coating layers 18 by a series of dies or other conventional methods. The first and second coating layers are then cured by ultra violet radiation from a series of UV lamps covering one section of the optical fiber as it is drawn.

Figure 2:
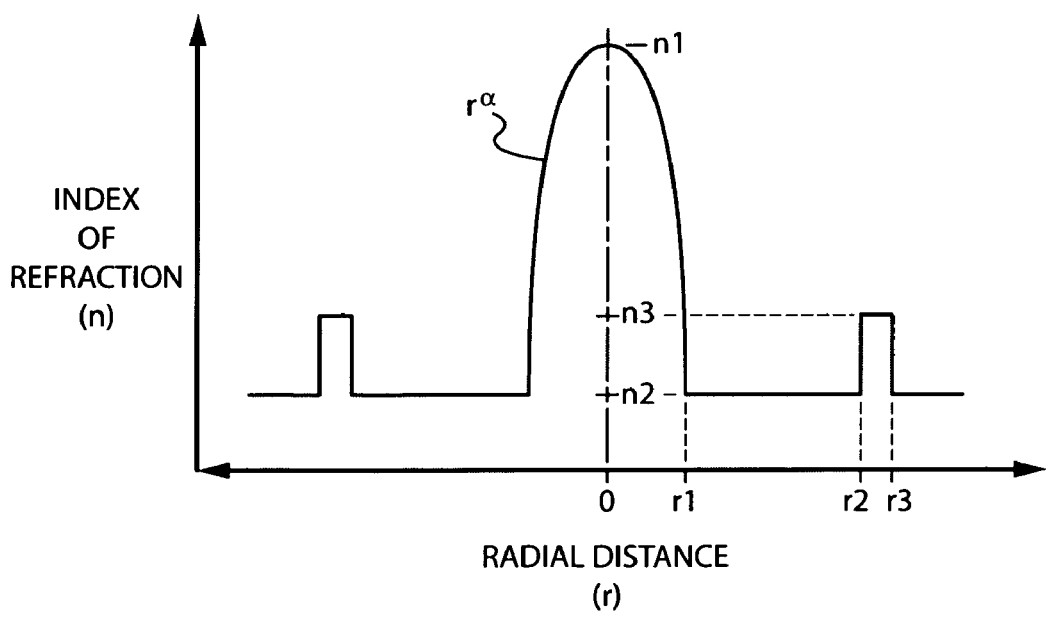
FIG. 2 is a pictorial representation of an exemplary refractive index profile for the optical fiber illustrated in FIG. 1.

An exemplary profile of the index of refraction of the optical fiber 10 made by this process is shown in FIG. 2. The index of refraction (n) is shown along the ordinate axis as a function of the radial distance (r) from the central axis of the optical fiber 10. The core 12 has an index n1 which is greater than the index n2 of the cladding layer 14. The first coating layer 16 has an index n3 which is greater than the index n2 of the cladding layer.

In the illustrated embodiment, the index n1 of the core 12 has a graded index (GI) profile which is determined during the core doping process, for example with Germanium (Ge) increasing the index of a silica core material. The GI profile of the core 12 enables the optical fiber 10 to display a much higher bandwidth-length-product (>100 MHz-km) than a typical step index silica core optical fiber. The diameter of the core 12 (2rl) may be varied to optimize it to meet the requirements for the optical fiber 10 including the attenuation, type of light source used, tolerance of the optical subassembly, insertion loss of the connector to be used, cost, etc. Typical values of the diameter of the core 12 could range from 20 μm. to 180 μm. Typical values of the diameter of the cladding 14 could range from 100 μm. to 225 μm.

The first coating layer is made in accordance with the teachings of U.S. Pat. Nos. 4,707,076 or 4,511,209 issued to Skutnik, et al. and comprises at least one ethylenically unsaturated monene, a polyene and a curing initiator. The disclosures of Skutnik, et al. are hereby incorporated by reference. Further additions are made to the polymer coating to make it hard so that during the cleaving process it will fracture cleanly with the glass core but still withstand the crimping process without breaking.

With reference to Table B of FIG. 4, the first coating layer 14 surrounding the cladding layer 12 has a refractive index greater than the cladding layer, i.e. greater than 1.43 if the core is silica, preferably about 1.46. This allows the first coating layer to mode strip the light from the cladding layer and in combination with the graded index profile of the core increase the bandwidth-length product of the optical fiber. The first coating layer is also preferably a polymer with similar fracture characteristics to the silica glass of the core and the cladding and having a good adhesion to the silica glass. Preferably the first coating layer has an elongation at fracture of less than 20%, preferably less than 10%, closely resembling that of silica. However, the first coating layer being a polymer is relatively tough and durable. The Young's modulus of the first coating when cured should exceed 50, and more preferably would be approximately 68. This produces the advantage of when the fiber is cleaved for connectorization that the first coating layer will fracture cleanly with the core and cladding but will remain durable enough for a connector to be crimped to it without fracturing above the cut.

The second coating layer 16 or buffer can be any known polymer that is used for a buffer layer in an optical fiber, preferably it will be ETFE. This additional layer will provide increased protection for the optical fiber.

FIG. 3 in Table A lists the operational and physical parameters of several examples of optical fiber constructed in accordance with the invention which are then compared those now available from a SI silica core optical fiber with a polymer coating.

EXAMPLE 1

A preform manufactured by an MCVD process to provide a Ge doped core and a non-doped silica cladding. The optical profile of the preform is such that, when it is drawn, the optical fiber produced will have a core diameter of 62.5 μm and a clad diameter of 200 μm. The refractive index of the core is a graded profile and varies as a power function of the radial distance from the center of the fiber, $R^\alpha$, where $\alpha=\sim2$. The refractive index of the cladding is approximately that of silica. The preform was then set on a draw tower with one end in a furnace. When the draw or drip end of the preform became molten it was tensioned and optical fiber was drawn from it. During drawing, the optical fiber is first coated with a UV curable polymer formulated according to Skutnik, et al. to have the properties of set forth in Table B of FIG. 4 by the application of a uniform and thin layer of liquid polymer via a coating die. The first coating was applied to a thickness of ~12 μm. and has a refractive index of approximately 1.46. The optical fiber then can be coated by a UV curable buffer layer or extruded polymer (e.g. ETFE) prior to the optical fiber being wound on a take up reel.

With reference now to FIG. 3 and Table A, Example 1 illustrates that optical fiber made in accordance with the invention retains the desirable qualities of the SI polymer clad silica core fiber in that it has low attenuation at 850 nm and 1310 nm and the capability to be used in a crimp and cleave connection process. Further, the optical fiber made in accordance with the invention in Example 1 demonstrates a sufficiently large numerical aperture of 0.275. More importantly, the new design has improved the BLP from 10 to >100 allowing its use in significantly more communications systems which are faster and longer. The core of this fiber shares dimension and optical parameters (dopant levels and NA) with conventional 62.5 μm GI fibers, making this fiber highly compatible with existing commodity product. Additionally, the 200 μm glass cladding provides significantly higher tensile strength than 125 μm clad fibers.

EXAMPLE 2

A preform manufactured by an MCVD process to provide a Ge doped core and a non-doped silica cladding. The optical profile of the preform is such that, when it is drawn, the optical fiber produced will have a core diameter of 100 μm and a clad diameter of 200 μm. The refractive index of the core is a graded profile and varies as a power function of the radial distance from the center of the fiber, $R^\alpha$, where α=~2. The refractive index of the cladding is approximately that of silica. The preform was then set on a draw tower with one end in a furnace. When the draw or drip end of the preform became molten it was tensioned and optical fiber was drawn from it. During drawing, the optical fiber is first coated with a UV curable polymer formulated according to Skutnik, et al. to have the properties of set forth in Table B of FIG. 4 by the application of a uniform and thin layer of liquid polymer via a coating die. The first coating was applied to a thickness of ~12 μm. and has a refractive index of approximately 1.46. The optical fiber can then be coated by a UV curable buffer layer or extruded polymer (e.g. ETFE) prior to the optical fiber being wound on a take up reel.

With reference now to FIG. 3 and Table A, Example 2 illustrates that optical fiber made in accordance with the invention retains the desirable qualities of the SI polymer clad silica core fiber in that it has low attenuation at 850 nm and 1310 nm and the capability to he used in a crimp and cleave connection process. Further, the optical fiber made in accordance with the invention in Example 2 demonstrates a sufficiently large numerical aperture of 0.275. More importantly, the new design has improved the BLP from 10 to >100 allowing its use in significantly more communications systems which are faster and longer. This example further illustrates with Example 1 that there are a range of core diameters that be used within the scope of the invention without appreciably varying the desirable qualities of the optical fiber. Additionally, the 200 μm glass cladding provides significantly higher tensile strength than 125 μm clad fibers.

EXAMPLE 3

A preform manufactured by an MCVD process to provide a Ge doped core and a non-doped silica cladding. The optical profile of the preform is such that, when it is drawn, the optical fiber produced will have a core diameter of 62.5 μm and a clad diameter of 125 μm. The refractive index of the core is a graded profile and varies as a power function of the radial distance from the center of the fiber, $R^\alpha$, where α=~2. The refractive index of the cladding is approximately that of silica. The preform was then set on a draw tower with one end in a furnace. When the draw or drip end of the preform became molten it was tensioned and optical fiber was drawn from it. During drawing, the optical fiber is first coated with a UV curable polymer formulated according to Skutnik, et al. to have the properties of set forth in Table B of FIG. 4 by the application of a uniform and thin layer of liquid polymer via a coating die. The first coating was applied to a thickness of ~12 μm. and has a refractive index of approximately 1.46. The optical fiber can then be coated by a UV curable buffer layer or extruded polymer (e.g. ETFE) prior to the optical fiber being wound on a take up reel.

With reference now to FIG. 3 and Table A, Example 3 illustrates that optical fiber made in accordance with the invention retains the desirable qualities of the SI polymer clad silica core fiber in that it has low attenuation at 850 nm and 1310 nm and the capability to he used in a crimp and cleave connection process. Further, the optical fiber made in accordance with the invention in Example 3 demonstrates a sufficiently large numerical aperture of 0.275. More importantly, the new design has improved the BLP from 10 to >100 allowing its use in significantly more communications systems which are faster and longer. This example further illustrates with Example 1 that there are a range of cladding diameters that he used within the scope of the invention without appreciably varying the desirable qualities of the optical fiber. The core of this fiber shares dimension and optical parameters (dopant levels an& NA) with conventional 62.5 μm GI fibers, making this fiber highly compatible with existing commodity product.

While the invention has been described in connection with the exemplary embodiments, this specification is not intended to limit the scope of the invention to the particular forms or methods set forth, but, to the contrary, it is intended to cover any such alternatives, modifications, and equivalents as may be included within the spirit and scope of the invention as defined by the appended claims.

What is claimed is:

1. An optical fiber with a core and a cladding layer surrounding the core comprising:
    the core having a core index of refraction;
    the cladding have a cladding index of refraction;
    a first coating layer surrounding the cladding layer having a first coating layer index of refraction;
    wherein the core has a diameter greater than approximately 62.5 μm;
    wherein the core index of fraction is greater than the cladding index of refraction and the first coating index of refraction is greater than the cladding index of refraction; and
    wherein the first coating layer has an elongation at fracture approximately that of the core and the cladding, and wherein the diameter of the first coating layer is greater than approximately 200 μm.

2. An optical fiber with a core and a cladding layer surrounding the core as set forth in claim 1 wherein the core is at least partially silica glass.

3. An optical fiber with a core and a cladding layer surrounding the core as set forth in claim 2 wherein the cladding is at least partially silica glass.

4. An optical fiber with a core and a cladding layer surrounding the core as set forth in claim 2 wherein the first coating layer is at least partially a polymer, and has a Young's Modulus of greater than 50.

5. An optical fiber with a core and a cladding layer surrounding the core as set forth in claim 2 wherein the core has a graded refractive index profile.

6. An optical fiber with a core and a cladding layer surrounding the core as set forth in claim 5 wherein the core is at least partially silica glass doped with Germanium.

7. An optical fiber with a core and a cladding layer surrounding the core as set forth in claim 1 which further comprises:
a second coating layer surrounding the first coating layer wherein the second coating layer is at least partially a polymer.

8. An optical fiber with a core and a cladding layer surrounding the core comprising:
the core having a core index of refraction wherein the core is at least partially of silica glass doped with Germanium having a graded refractive index profile;
the cladding have a cladding index of refraction wherein the cladding is at least partially silica;
a first coating layer surrounding the cladding layer having a first coating layer index of refraction wherein the first coating layer is at least partially a polymer, and wherein the diameter of the first coating layer is greater than approximately 200 μm;
wherein the core has a diameter greater than approximately 62.5 μm; and
wherein the core index of refraction is greater than the cladding index of refraction and the first coating index of refraction is greater than the cladding index of refraction.

9. An optical fiber with a core and a cladding layer surrounding the core as set forth in claim 8 which further comprises:
a second coating layer surrounding the first coating layer wherein the second coating layer is at least partially a polymer.

10. An optical fiber with a core and a cladding layer surrounding the core as set forth in claim 8 wherein the first coating layer has a refractive index of between 1.43 and 1.7, and a Young's Modulus of greater than 50.

11. An optical fiber with a core and a cladding layer surrounding the core as set forth in claim 8 wherein the first coating layer has a refractive index of approximately 1.46.

12. An optical fiber with a core and a cladding layer surrounding the core which has been drawn from a preform, the optical fiber comprising:
the core having a core graded index of refraction following a power profile of $R^\alpha$ where $\alpha$ is between 1.5 and 3;
the cladding have a cladding index of refraction of approximately non-doped silica;
a first coating layer of polymer surrounding the cladding layer having a first coating layer index of refraction of approximately 1.46, the first coating layer being applied in a UV curable form during the drawing process of the optical fiber;
wherein the core has a diameter greater than approximately 62.5 μm;
wherein the core index of refraction is greater than the cladding index of refraction and the first coating index of refraction is greater than the cladding index of refraction; and
wherein the first coating layer has an elongation at fracture approximately that of the core and the cladding, and wherein the diameter of the first coating layer of polymer is greater than approximately 200 μm.

13. An optical fiber as set forth in claim 12 wherein the core diameter of the optical fiber is 62.5 μm, the cladding diameter of the optical fiber is 200 μm, and the first coating diameter of the optical fiber is 225 μm.

14. An optical fiber as set forth in claim 12 wherein the core diameter of the optical fiber is 100 μm, the cladding diameter of the optical fiber is 200 μm, and the first coating diameter of the optical fiber is 225 μm.

15. An optical fiber with a silica core doped with Ge and a non-doped silica cladding layer surrounding the core which has been drawn from a preform, the optical fiber comprising:
the core having a core graded index of refraction following a power profile of $R^\alpha$ where $\alpha$ is between 1.5 and 3 and a diameter of between 20 μm to 180 μm;
the cladding have a cladding index of refraction of approximately non-doped silica and a diameter of between 100 μm. to 225 μm;
a first coating layer of polymer surrounding the cladding layer having a first coating layer index of refraction of approximately 1.46, the first coating layer being applied in a UV curable form during the drawing process of the optical fiber;
wherein the core has a diameter greater than approximately 62.5 μm;
wherein the core index of refraction is greater than the cladding index of refraction and the first coating index of refraction is greater than the cladding index of refraction; and
wherein the first coating layer has an elongation at fracture approximately of less than 20% and a Young's Modulus of greater than 50, and wherein the diameter of the first coating layer of polymer is greater than approximately 200 μm.

16. An optical fiber as set forth in claim 15 wherein the first coating layer has an elongation at fracture approximately of 9% and a Young's Modulus of 68.

17. An optical fiber as set forth in claim 15 wherein a bandwidth-length product of the fiber is greater than 100 MHz-km.

* * * * *